United States Patent
Zhou et al.

(10) Patent No.: US 10,272,499 B2
(45) Date of Patent: Apr. 30, 2019

(54) SELF-LOCKING DRILL CHUCK

(71) Applicant: ZHEJIANG SANOU MACHINERY CO. LTD., Zhejiang (CN)

(72) Inventors: Wenhua Zhou, Zhejiang (CN); Yanxing Xu, Zhejiang (CN)

(73) Assignee: ZHEJIANG SANOU MACHINERY CO. LTD., Zhejiang (CN)

( * ) Notice: Subject to any disclaimer, the term of this patent is extended or adjusted under 35 U.S.C. 154(b) by 127 days.

(21) Appl. No.: 15/369,111

(22) Filed: Dec. 5, 2016

(65) Prior Publication Data

US 2017/0225236 A1 Aug. 10, 2017

(30) Foreign Application Priority Data

Feb. 5, 2016 (CN) .......................... 2016 1 0082534

(51) Int. Cl.
*B23B 31/12* (2006.01)
(52) U.S. Cl.
CPC ........ *B23B 31/123* (2013.01); *B23B 31/1238* (2013.01); *B23B 2231/38* (2013.01); *B23B 2260/136* (2013.01)
(58) Field of Classification Search
CPC .............. B23B 31/123; B23B 31/1238; B23B 2231/38; Y10T 279/32; Y10T 279/17615
See application file for complete search history.

(56) References Cited

U.S. PATENT DOCUMENTS

2005/0087937 A1 * 4/2005 Zhou ................... B23B 31/123
279/62

FOREIGN PATENT DOCUMENTS

WO WO 2008092300 A1 * 8/2008 ........... B23B 31/123

* cited by examiner

*Primary Examiner* — Daniel Howell
*Assistant Examiner* — Paul M Janeski
(74) *Attorney, Agent, or Firm* — Muncy, Geissler, Olds & Lowe, P.C.

(57) ABSTRACT

A self-locking drill chuck is disclosed herein. Among the rotating sleeve, the spring leaf and the nut, the nut is rotated by the rotating sleeve without being driven by the spring leaf, the spring leaf is loaded on the nut to rotate with the nut synchronously, under normal state, the locking end of the spring leaf is in a closed state against the teeth, and the self-locking drill chuck is also provided with a state switching part which is connected with the rotating sleeve and rotates with the rotating sleeve synchronously; the spring leaf is provided with a state switching matching structure. The nut is directly driven by a rotating sleeve without the spring leaf during the rotating process in the clamping direction or the releasing direction, which can enhance the hand feeling and efficiency in the clamping operation; the spring leaf has self-locking functions which can be in normally closed and the elastic force is opposite to the centrifugal force, greatly enhancing the reliability of the drill chuck self-locking structure.

13 Claims, 6 Drawing Sheets

SELF-LOCKING DRILL CHUCK

FIELD OF THE INVENTION

The present invention relates to a self-locking drill chuck.

BACKGROUND

In the prior art, the drill chuck is provided with a drill body, a clamping jaw and a nut. By rotating the nut, the clamping jaw is driven to move forward or backward to make the drill chuck to clamp or loosen the drill tool. The self-locking structure of the drill chuck is a structure that can prevent the drill tool from being loosened by the reaction force during working. Generally the part with a spring leaf is fit with teeth on the drill body. For the existing self-locking drill chuck, the spring leaf should have more functions including self-locking, and during the whole or most stroke when the nut of drill chuck is rotating in the clamping direction, the rotating sleeve needs to be driven by the spring leaf and the spring leaf has too high load, which easily causes the failure of self-locking functions of the self-locking drill chuck. In addition, the spring leaf is made in a normally open state of sprung outwardly in most self-locking drill chucks. The locking end of the spring leaf is pressed between teeth forcibly by the cam surface on the rotating sleeve which influences the connecting structure of the rotating sleeve; and it is always subject to a centrifugal force during working, this kind of structure has influence on the stability of the self-locking function.

SUMMARY

The object of the present invention is to provide a self-locking drill chuck which can improve the reliability of the drill chuck self-locking structure and enhance the hand feeling and efficiency during clamping operation. To achieve the object, the invention employs the following technical solutions:

A self-locking drill chuck, including a rotating sleeve, a drill body, a nut, a clamping jaw, a self-locking structure, the self-locking structure includes teeth and a spring leaf, the teeth are on the drill body or the part fixed on the drill body, and the spring leaf has a locking end matching with teeth, wherein, Among the rotating sleeve, the spring leaf and the nut, the nut is rotated by the rotating sleeve without being driven by the spring leaf, the spring leaf is loaded on the nut to rotate with the nut synchronously, under normal state, the locking end of the spring leaf is in a closed state against the teeth, and the self-locking drill chuck is also provided with a state switching part which is connected with the rotating sleeve and rotates with the rotating sleeve synchronously;

The spring leaf is provided with a state switching matching structure, and the state switching part rotates a certain angle relative to the spring leaf to the first direction, to make the first position match with the state switching matching structure and the locking end of the spring leaf is changed from the closed state to the open state to release from the teeth, the state switching part rotates a certain angle relative to the spring leaf to the second direction, to make the second position match with the state switching matching structure and the locking end of the spring leaf is changed from the open state to the closed state to insert into the teeth, the first direction is the rotating direction of the rotating sleeve when releasing the clamped tool, and the second direction is the rotating direction of the rotating sleeve when clamping the clamped tool;

The nut is connected with the rotating sleeve by a limit clutch connecting structure, and the limit clutch connecting structure is set with a section of idle running of the rotating sleeve, the rotating angle of rotating sleeve during the idle running is corresponding to the certain angle, during idle running, the rotating sleeve and the nut are in detached state, the rotating sleeve drives the state switching part rather than the nut to rotate, to make the state switching part match with the state switching matching structure at the first position and switch with the state switching matching structure at the second position; at the end of idle running, the rotating sleeve continues to rotate and drive the nut and the state switching part to rotate, and the state switching part does not rotate relative to the spring leaf.

Further, the drill chuck has a state indicating structure for indicating the first position matching with the state switching matching structure or/and indicating the second position to switch and match with the state switching matching structure.

Further, the state indicating structure includes a second spring leaf connected with the spring leaf and a protrusion or a groove provided on the second spring leaf, the state indicating structure further includes a groove or a protrusion on the rotating sleeve matching with the protrusion or groove on the second spring leaf, when the first position matches with the state switching matching structure or the second position switches to match with the state switching matching structure, the corresponding protrusion or groove on the second spring leaf forms an insertion fit with the corresponding groove and protrusion on the rotating sleeve.

Further, the spring leaf with locking end is a spring leaf which springs inwardly, and the teeth are at inside of the spring leaf with locking end.

Further, the state switching part is a ring, the first position and the second position are outside the ring, and the state switching part is provided with a slot, the slot matches with a key on the rotating sleeve, to make the state switching part to connect the rotating sleeve to rotate with the rotating sleeve synchronously.

Further, the key on the rotating sleeve is a part of the limit clutch connecting structure, the nut or the part that is fixedly connected with the nut is provided with slots matching with the idle running and coupling with the key.

Further, the limit clutch connecting structure includes a key on a rotating sleeve and a slot that matches with the idle running and couples with the key on the nut and/or on the part fixedly connected to the nut.

Further, the drill chuck is further provided with a second ring being fixedly connected to the nut, and the spring leaf with locking end is located at the second ring.

Further, the drill chuck is further provided with a second ring being fixedly connected to the nut, and the spring leaf with locking end and the second spring leaf are located at the second ring.

Further, the state switching matching structure includes a third spring leaf connected with the spring leaf that is sprung inwardly and the inward protrusion on the third spring leaf, when the third spring leaf is twisted and deformed outward by the state switching part, the spring leaf that is sprung inwardly is twisted and deformed to the outside.

Since the technical solutions are employed in the invention, the nut is directly driven by a rotating sleeve without the spring leaf during the rotating process in the clamping direction or the releasing direction, which can enhance the hand feeling and efficiency in the clamping operation; the spring leaf has self-locking functions which can be in normally closed and the elastic force is opposite to the centrifugal force, greatly enhancing the reliability of the drill chuck self-locking structure.

DETAILED DESCRIPTION

EXAMPLE 1

Figure 1:
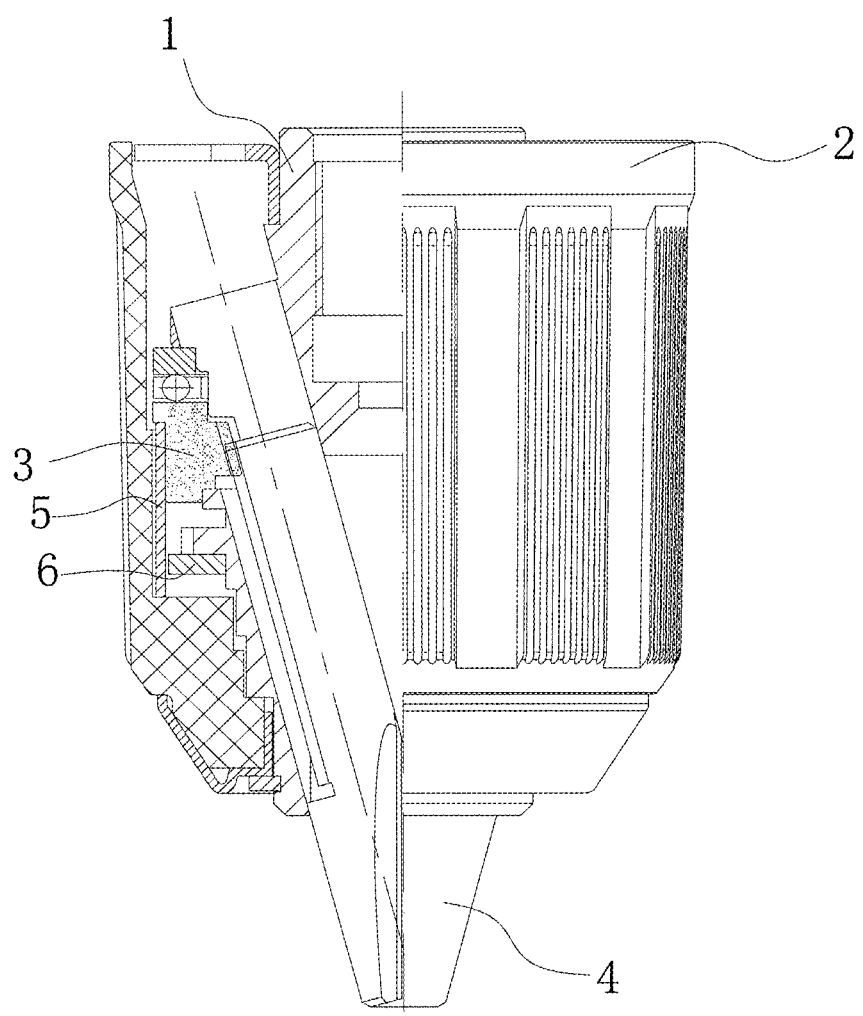
FIG. 1 is a semi cross-sectional view of the invention according to embodiment 1.
Figure 2:
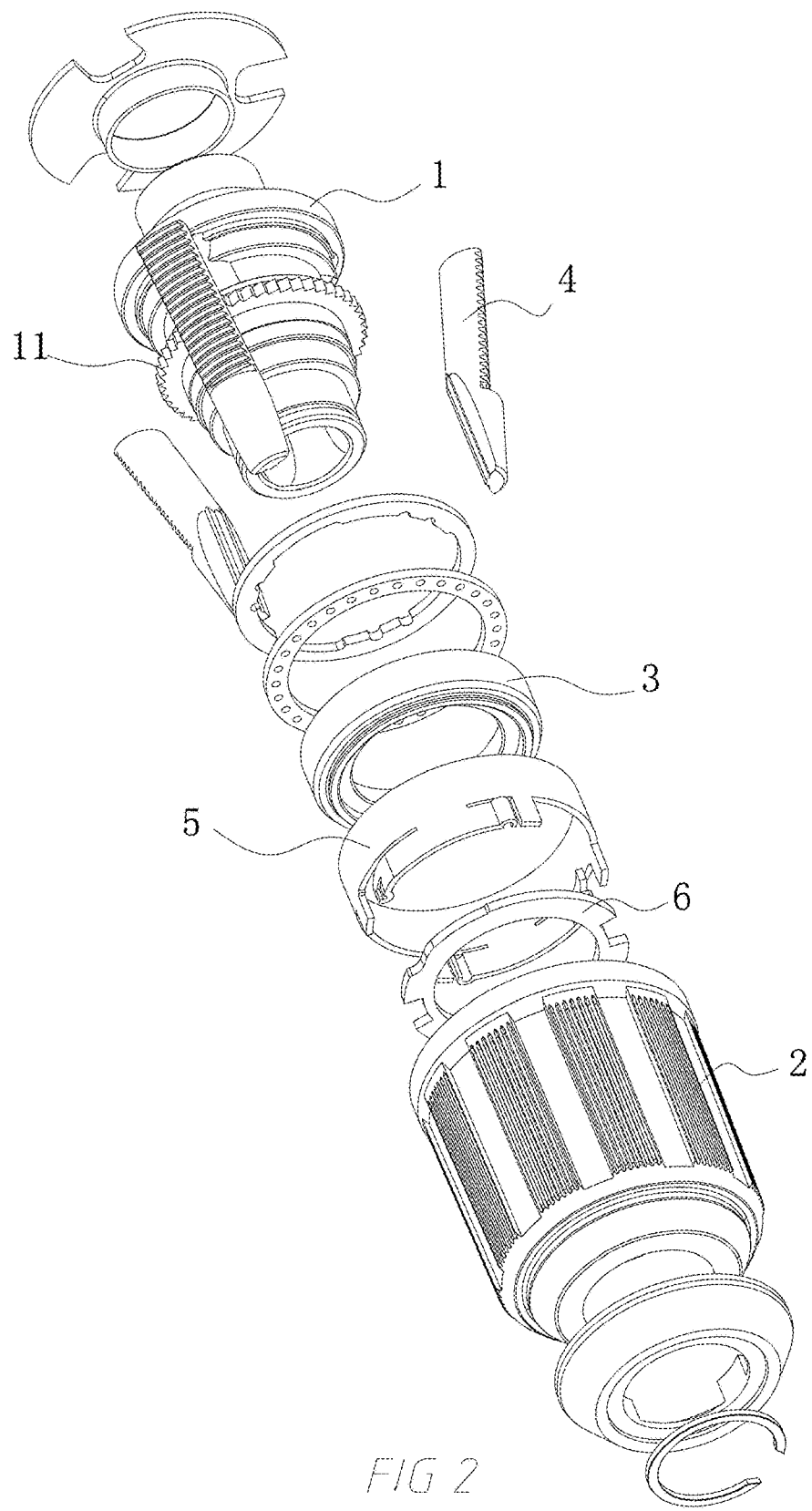
FIG. 2 is an exploded view of the embodiment shown in FIG. 1.
Figure 3:
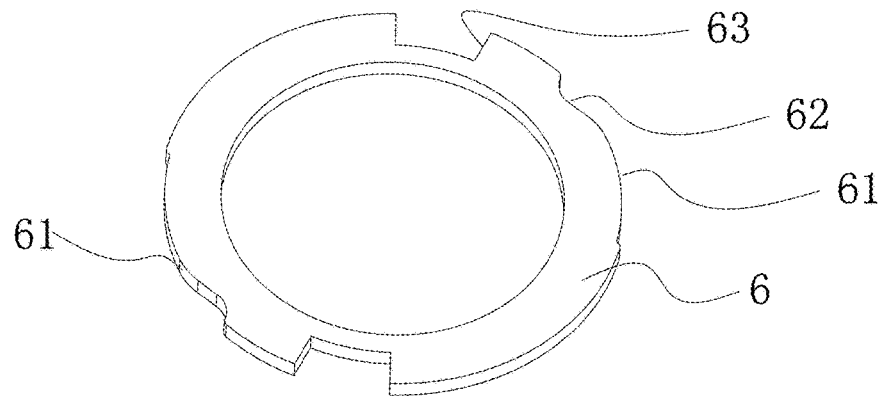
FIG. 3 is a three-dimensional schematic of a state switching part in the embodiment shown in FIG. 1.
Figure 4:
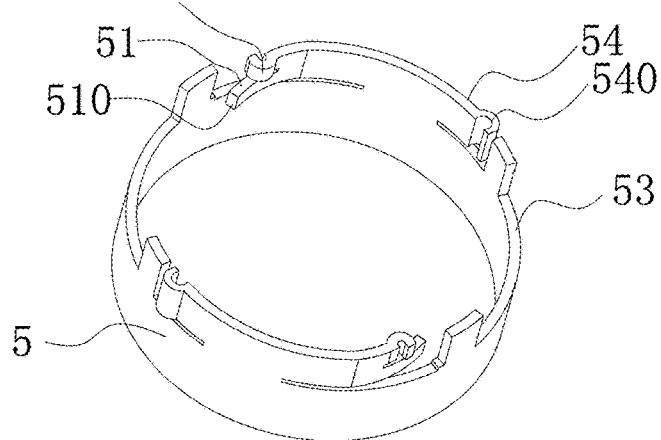
FIG. 4 is a schematic view of a second ring in the embodiment shown in FIG. 1.
Figure 5:
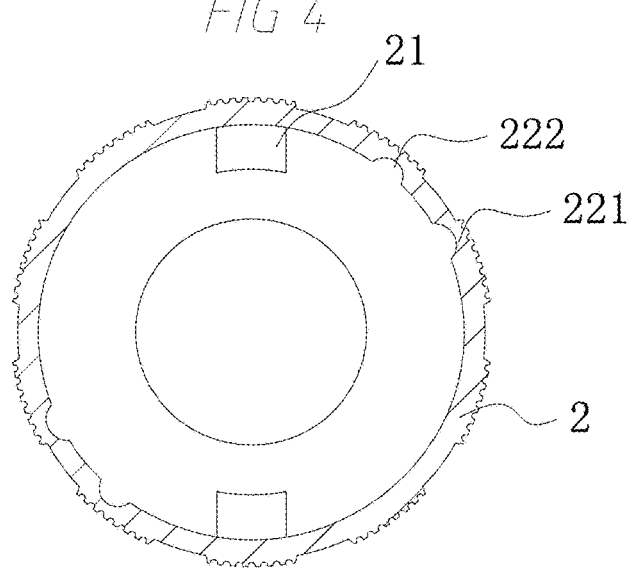
FIG. 5 is a cross-sectional view of a rotating sleeve in the embodiment shown in FIG. 1.
Figure 6:
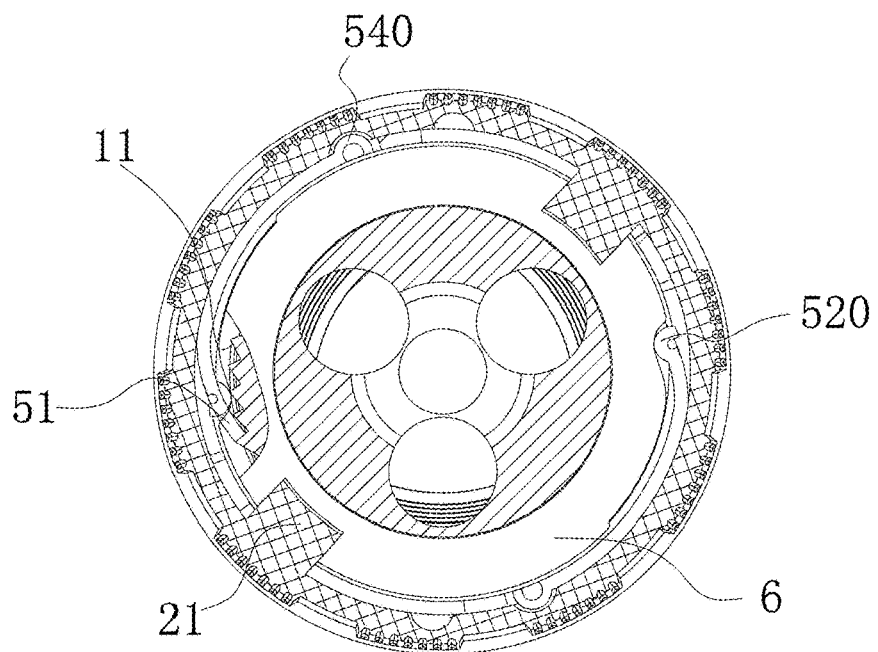
FIG. 6 is a cross-sectional view of the drill chuck when the second position matches the state switching matching structure.
Figure 7:
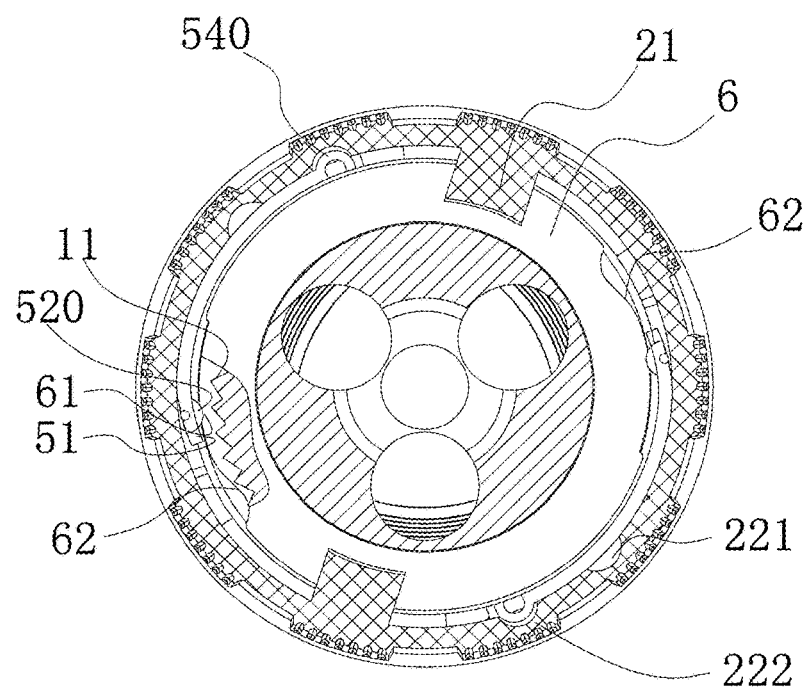
FIG. 7 is a cross-sectional view of the drill chuck when the first position matches the state switching matching structure.

Referring to FIGS. 1-7, a self-locking drill chuck provided in the invention, including a rotating sleeve 2, a drill body 1, a nut 3, a clamping jaw 4, a self-locking structure, the self-locking structure includes teeth 11 and a spring leaf 51, the teeth 11 are on the drill body, and the spring leaf 51 has a locking end 510 matching with teeth 11.

Among the rotating sleeve 2, the spring leaf 51 and the nut 3, the nut 3 is rotated by the rotating sleeve 2 without being driven by the spring leaf 51, the spring leaf 51 is loaded on the nut 3 to rotate with the nut 3 synchronously, under normal state, the locking end 510 of the spring leaf is in a closed state against the teeth 11, that is, in the present invention, the locking end 510 is always inserted between teeth unless operated, by this way, since the teeth 11 are located inside the spring leaf 51 and the spring leaf 51 is sprung inwardly, the spring force is opposite to the centrifugal force during working, which improves the reliability.

The self-locking drill chuck is also provided with a state switching part 6, which may be a ring, and a first position 61 and a second position 62 are on the outer side, and the state switching part is provided with a slot 63, the slot 63 matches with the key 21 on the rotating sleeve 2, to connect the state switching part 6 and the rotating sleeve 2 and rotate with the rotating sleeve 2 synchronously.

The spring leaf 51 is provided with a state switching matching structure, and the state switching part 6 rotates a certain angle relative to the spring leaf 51 to the first direction, to make the first position 61 match with the state switching matching structure and the locking end 510 of the spring leaf is changed from the closed state to the open state, that is, the locking end 510 is disengaged from teeth 11 when the first portion 61 matches with the state switching mating structure. The state switching part 6 rotates a certain angle relative to the spring leaf 51 to the second direction, to make the second position 62 match with the state switching matching structure and the locking end 510 of the spring leaf is changed from the open state to the closed state to insert into the teeth, the first direction is the rotating direction of the rotating sleeve 2 when releasing the clamped tool, and the second direction is the rotating direction of the rotating sleeve 2 when clamping the clamped tool.

The state switching matching structure includes a third spring leaf 52 connected with the spring leaf 51 that is sprung inwardly and the inward protrusion 520 on the third spring leaf 52, when the third spring leaf 52 is twisted and deformed outwardly by the state switching part 6, the spring leaf 51 that is sprung inwardly is twisted and deformed to the outside, and the locking end 510 is changed from a closed state to an open state.

The nut 3 is connected with the rotating sleeve 2 by a limit clutch connecting structure, and the limit clutch connecting structure is set with a section of idle running of the rotating sleeve, the rotating angle of rotating sleeve 2 during the idle running is corresponding to the certain angle, during idle running, the rotating sleeve 2 and the nut 3 are in detached state, the rotating sleeve 2 drives the state switching part 6 rather than the nut 3 to rotate, to make the state switching part 6 match with the state switching matching structure at the first position 61 and switch with the state switching matching structure at the second position 62; at the end of idle running, the rotating sleeve 2 continues to rotate and drive the nut 3 and the state switching part 6 to rotate, and the state switching part 6 does not rotate relative to the spring leaf 51.

The drill chuck has a state indicating structure for indicating the first position matching with the state switching matching structure, so that users can feel them when the locking end 510 of the spring leaf 51 is changed from a closed state to an open state. Further, the state indicating structure can also be equipped with a structure for indicating the switching of the second position to match with the state switching matching structure, so that users can feel them when the locking end 510 of the spring leaf 51 is changed from an open state to a closed state.

Figure 8:
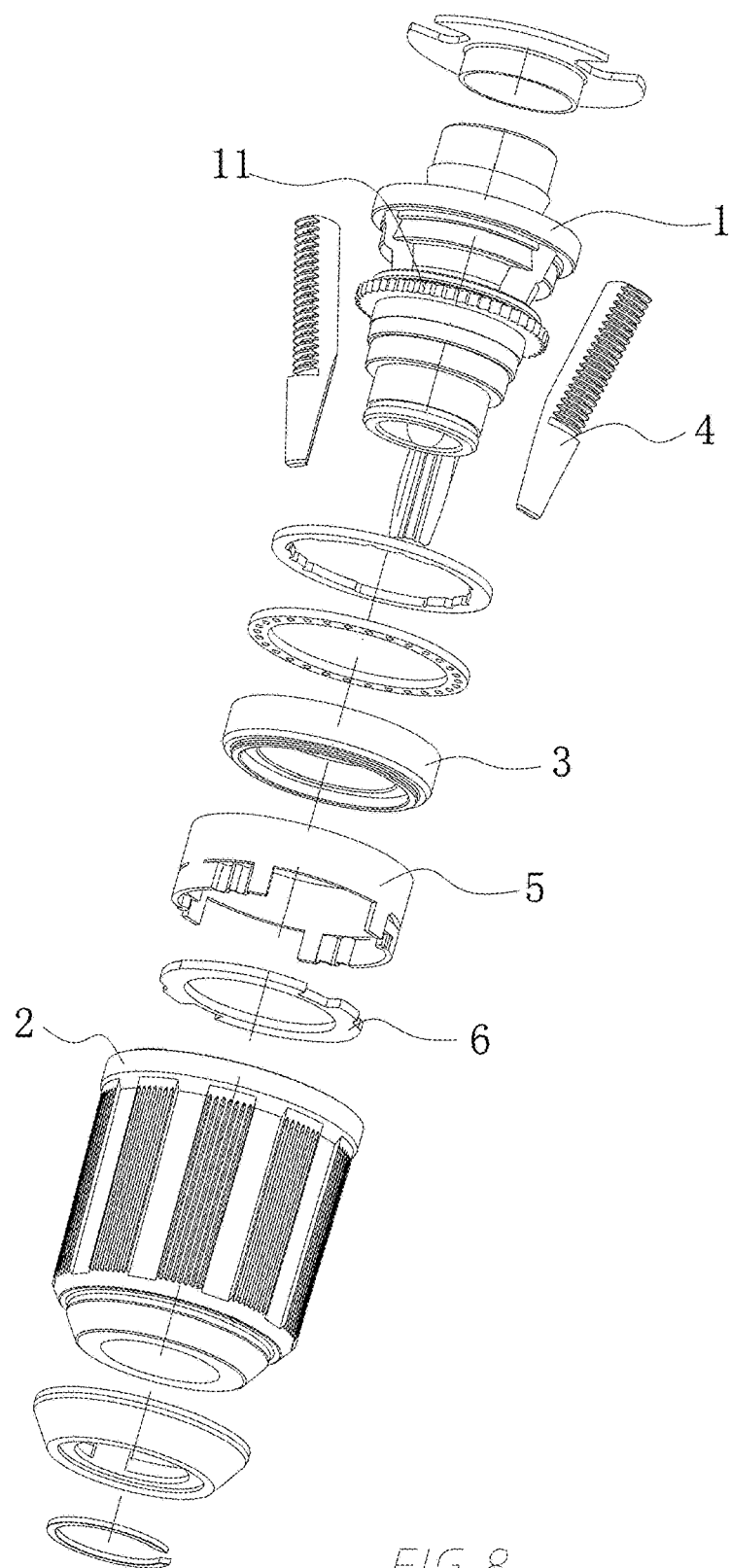
FIG. 8 is an exploded view of another embodiment in the invention.
Figure 9:
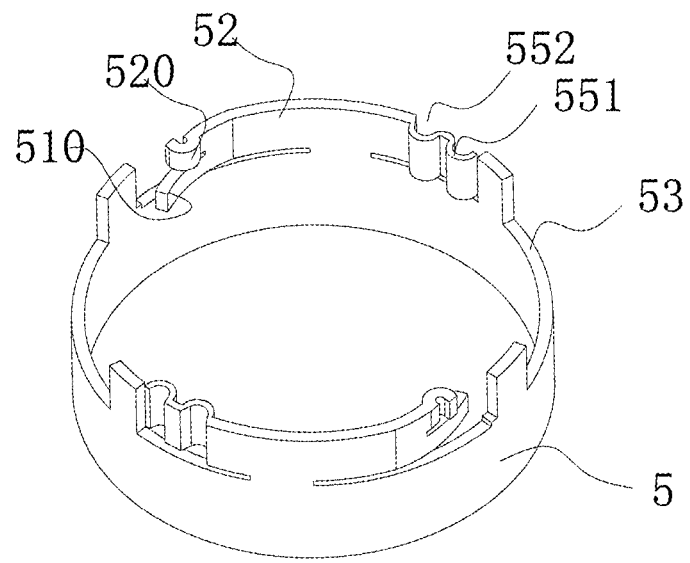
FIG. 9 is a schematic view of a second ring in the embodiment shown in FIG. 8.
Figure 10:
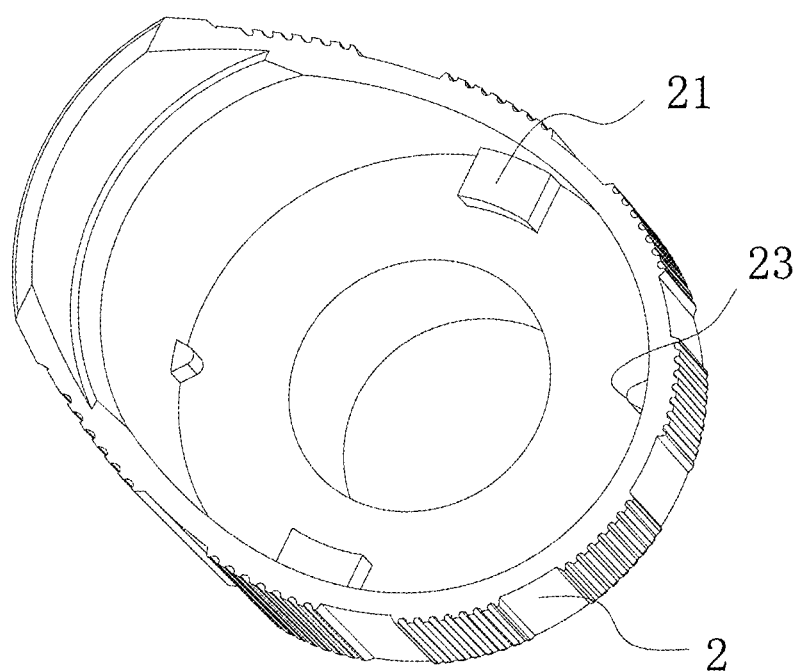
FIG. 10 is a partial sectional view of a rotating sleeve in the embodiment shown in FIG. 8.

The state indicating structure includes a second spring leaf 54 connected with the spring leaf 51 and a protrusion 540 provided on the second spring leaf 54, the state indicating structure further includes grooves 221, 222 on the rotating sleeve matching with the protrusion or groove on the second spring leaf, when the first position 61 matches with the state switching matching structure, the corresponding protrusion 540 on the second spring leaf 54 forms an insertion fit with the corresponding groove 221 on the rotating sleeve, when the second position 62 matches with the state switching matching structure, the corresponding protrusion 540 on the second spring leaf 54 forms an insertion fit with the corresponding groove 222 on the rotating sleeve. Referring to FIGS. 8-10, grooves 551 and 552 can be provided on the second spring leaf 54, and protrusion 23 can be provided on the rotating sleeve, and the two grooves or protrusion corresponding to the first position 61 and second position 62 can be provided on the second spring leaf 54, marked by 551 and 552 respectively.

The key 21 on the rotating sleeve 2 is a part of the limit clutch connecting structure. The limit clutch connecting structure further includes a slot 53 matching with the idle running and coupling with the key 21 on the nut 3 or on the part that is fixedly connected with the nut 3. In this embodiment, the slot 53 is arranged at the second ring 5 which is fixedly connected outside of the nut, by this way, the nut 3 can be made into two halves, and the two half-nuts can be formed a whole nut 3 by the second ring 5.

The spring leaf 51 with a locking end 510, the second spring leaf 54 and the third spring leaf 52 are all on the second ring 5.

The limit clutch connecting structure is in a detached state during idle running, i.e. the key 21 is moving in the slot 53, the nut does not rotate. When the rotating sleeve moves towards the first direction from the starting point of the first direction (i.e. the position that the key 21 collides with one end wall of the slot 53), the state switching part 6 rotates relative to the spring leaf 51 to make the locking end of the spring leaf from a closed state to an open state; when rotating to the end point (i.e. when the key 21 collides with another end wall of the slot 53), the limit clutch connecting structure is in a closed state to have a limiting and connecting effect. The rotating sleeve and nut are in a connecting state, the rotating sleeve can drive the nut to rotate in the first direction to eventually loosen the clamped tool from the clamping jaw, and the state switching part 6 does not rotate relative to the spring leaf 51, the locking end is always in an open state. When the rotating sleeve rotates towards to the second direction from the starting point of the second direction (i.e. the position that the key 21 collides with another end wall of the slot 53), the state switching part 6 rotates relative to the spring leaf 51 to make the locking end of the spring leaf from an open state to a closed state; when rotating to the end point (i.e. when the key 21 collides with one end wall of the slot 53), the limit clutch connecting structure is in a closed state to have a limiting and connecting effect. The rotating sleeve and nut are in a connecting state, the rotating sleeve can drive the nut to rotate in the second direction to eventually clamp the clamped tool by the clamping jaw, and the state switching part 6 does not rotate relative to the spring leaf 51, the locking end is always in a closed state.

The above described are only specific embodiments of the invention, but the structural features of the invention are not limited herein. Any changes or modifications made by technicians skilled in the art without departing from the concepts and spirit of the invention should fall within the scope of protection of the present invention.

The invention claimed is:

1. A self-locking drill chuck, comprising a rotating sleeve, a drill body, a nut, a clamping jaw, a self-locking structure, the self-locking structure comprises teeth and a spring leaf, the teeth are on the drill body or the part fixed on the drill body, and the spring leaf has a locking end matching with teeth, wherein among the rotating sleeve, the spring leaf and the nut, the nut is rotated by the rotating sleeve without being driven by the spring leaf, the spring leaf is loaded on the nut to rotate with the nut synchronously, under normal state, the locking end of the spring leaf is in a closed state against the teeth, and the self-locking drill chuck is also provided with a state switching part which is connected with the rotating sleeve and rotates with the rotating sleeve synchronously, the spring leaf is provided with a state switching matching structure, and the state switching part rotates a certain angle relative to the spring leaf to the first direction, to make the first position match with the state switching matching structure and the locking end of the spring leaf is changed from the closed state to the open state to release from the teeth, the state switching part rotates a certain angle relative to the spring leaf to the second direction, to make the second position match with the state switching matching structure and the locking end of the spring leaf is changed from the open state to the closed state to insert into the teeth, the first direction is the rotating direction of the rotating sleeve when releasing the clamped tool, and the second direction is the rotating direction of the rotating sleeve when clamping the clamped tool, the nut is connected with the rotating sleeve by a limit clutch connecting structure, and the limit clutch connecting structure is set with a section of idle running of the rotating sleeve, the rotating angle of rotating sleeve during the idle running is corresponding to the certain angle, during idle running, the rotating sleeve and the nut are in detached state, the rotating sleeve drives the state switching part rather than the nut to rotate, to make the state switching part match with the state switching matching structure at the first position and switch with the state switching matching structure at the second position; at the end of idle running, the rotating sleeve continues to rotate and drive the nut and the state switching part to rotate, and the state switching part does not rotate relative to the spring leaf, the drill chuck has a state indicating structure for indicating the first position matching with the state switching matching structure or/and indicating the second position to switch and match with the state switching matching structure, the state indicating structure comprises a second spring leaf connected with the spring leaf and a protrusion or a groove provided on the second spring leaf, the state indicating structure further comprises a groove or a protrusion on the rotating sleeve matching with the protrusion or groove on the second spring leaf, and when the first position matches with the state switching matching structure or the second position switches to match with the state switching matching structure, the corresponding protrusion or groove on the second spring leaf forms an insertion fit with the corresponding groove and protrusion on the rotating sleeve.

2. The self-locking drill chuck according to claim 1, wherein the spring leaf with locking end is a spring leaf which springs inwardly, and the teeth are at inside of the spring leaf with locking end.

3. The self-locking drill chuck according to claim 1, wherein the limit clutch connecting structure comprises a key on a rotating sleeve and a slot that matches with the idle running and couples with the key on the nut and/or on the part fixedly connected to the nut.

4. The self-locking drill chuck according to claim 1, wherein the drill chuck is further provided with a second ring being fixedly connected to the nut, and the spring leaf with locking end is located at the second ring.

5. A self-locking drill chuck, comprising a rotating sleeve, a drill body, a nut, a clamping jaw, a self-locking structure, the self-locking structure comprises teeth and a spring leaf, the teeth are on the drill body or the part fixed on the drill body, and the spring leaf has a locking end matching with teeth, wherein among the rotating sleeve, the spring leaf and the nut, the nut is rotated by the rotating sleeve without being driven by the spring leaf, the spring leaf is loaded on the nut to rotate with the nut synchronously, under normal state, the locking end of the spring, leaf is in a closed state against the teeth, and the self-locking drill chuck is also provided with a state switching part which is connected with the rotating sleeve and rotates with the rotating sleeve synchronous, the spring leaf is provided with a state switching matching structure, and the state switching part rotates a certain angle relative to the spring leaf to the first direction, to make the first position match with the state switching matching structure and the locking end of the spring leaf is changed from the closed state to the open state to release from the teeth, the state switching part rotates a certain angle relative to the spring leaf to the second direction, to make the second position match with the state switching matching structure and the locking end of the spring leaf is changed from the open state to the closed state to insert into the teeth, the first direction is the rotating direction of the rotating sleeve when releasing the clamped tool, and the second direction is the rotating direction of the rotating sleeve when clamping the clamped tool, the nut is connected with the rotating sleeve by a limit clutch connecting structure, and the limit clutch connecting structure is set with a section of idle running of the rotating sleeve, the rotating angle of rotating sleeve during the idle running is corresponding to the certain angle, during idle running, the rotating sleeve and the nut are in detached state, the rotating sleeve drives the state switching part rather than the nut to rotate, to make the state switching part match with the state switching matching structure at the first position and switch with the state switching matching structure at the second position; at the end of idle running, the rotating sleeve continues to rotate and drive the nut and the state switching part to rotate, and the state switching part does not rotate relative to the spring leaf, and the state switching part is a ring, the first position and the second position are outside the ring, and the state switching part is provided with a slot, the slot matches with a key on the rotating sleeve, to make the state switching part to connect the rotating sleeve to rotate with the rotating sleeve synchronously.

6. The self-locking drill chuck according to claim 5, wherein the key on the rotating sleeve is a part of the limit clutch connecting structure, the nut or the part that is fixedly connected with the nut is provided with slots matching with the idle running and coupling with the key.

7. The self-locking drill chuck according to claim 5, wherein the spring leaf with locking end is a spring leaf which springs inwardly, and the teeth are at inside of the spring leaf with locking end.

8. The self-locking drill chuck according to claim 5, wherein the limit clutch connecting structure comprises a key on a rotating sleeve and a slot that matches with the idle running and couples with the key on the nut and/or on the part fixedly connected to the nut.

9. The self-locking drill chuck according to claim 5, wherein the drill chuck is further provided with a second ring being fixedly connected to the nut, and the spring leaf with locking end is located at the second ring.

10. A self-locking drill chuck, comprising a rotating sleeve, a drill body, a nut, a clamping jaw, a self-locking structure, the self-locking structure comprises teeth and a spring leaf, the teeth are on the drill body or the part fixed on the drill body, and the spring leaf has a locking end matching with teeth, wherein among the rotating sleeve, the spring leaf and the nut, the nut is rotated by the rotating sleeve without being driven by the spring leaf, the spring leaf is loaded on the nut to rotate with the nut synchronously, under normal state, the locking end of the spring leaf is in a closed state against the teeth, and the self-locking drill chuck is also provided with a state switching part which is connected with the rotating sleeve and rotates with the rotating sleeve synchronously, the spring leaf is provided with a state switching matching structure, and the state switching part rotates a certain angle relative to the spring leaf to the first direction, to make the first position match with the state switching matching structure and the locking end of the spring, leaf is changed from the closed state to the open state to release from the teeth, the state switching part rotates a certain angle relative to the spring leaf to the second direction, to make the second position match with the state switching matching structure and the locking end of the spring leaf is changed from the open state to the closed state to insert into the teeth, the first direction is the rotating direction of the rotating sleeve when releasing the clamped tool, and the second direction is the rotating direction of the rotating sleeve when clamping the clamped tool, the nut is connected with the rotating sleeve by a limit clutch connecting structure, and the limit clutch connecting structure is set with a section of idle running of the rotating sleeve, the rotating angle of rotating sleeve during the idle running is corresponding the certain angle, during idle running, the rotating sleeve and the nut are in detached state, the rotating sleeve drives the state switching part rather than the nut to rotate, to make the state switching part match with the state switching matching structure at the first position and switch with the state switching matching structure at the second position; at the end of idle running, the rotating sleeve continues to rotate and drive the nut and the state switching part to rotate, and the state switching part does not rotate relative to the spring leaf, and the state switching matching structure comprises a third spring leaf connected with the spring leaf that is sprung inwardly and the inward protrusion on the third spring leaf, when the third spring leaf is twisted and deformed outward by the state switching part, the spring leaf that is sprung inwardly is twisted and deformed to the outside.

11. The self-locking drill chuck according to claim 10, wherein the spring leaf with locking end is a spring leaf which springs inwardly, and the teeth are at inside of the spring leaf with locking end.

12. The self-locking drill chuck according to claim 10, wherein the limit clutch connecting structure comprises a key on a rotating sleeve and a slot that matches with the idle running and couples with the key on the nut and/or on the part fixedly connected to the nut.

13. The self-locking drill chuck according to claim 10, wherein the drill chuck is further provided with a second ring being fixedly connected to the nut, and the spring leaf with locking end is located at the second ring.

\* \* \* \* \*